United States Patent
Franc et al.

(10) Patent No.: US 12,469,308 B2
(45) Date of Patent: Nov. 11, 2025

(54) SYSTEM AND METHODS FOR AUTOMATICALLY DETECTING OBJECTS OF INTEREST AND DETERMINING THEIR GEOGRAPHIC POSITIONS

(71) Applicant: DCX Innovations sp. z o.o., Warsaw (PL)

(72) Inventors: Marcin Franc, Lodz (PL); Piotr Wisniewski, Warsaw (PL); Andreas Fleischmann, Berlin (DE)

(73) Assignee: DCX Innovations sp. z o.o., Warsaw (PL)

( * ) Notice: Subject to any disclaimer, the term of this patent is extended or adjusted under 35 U.S.C. 154(b) by 19 days.

(21) Appl. No.: 18/526,837

(22) Filed: Dec. 1, 2023

(65) Prior Publication Data
US 2024/0265714 A1   Aug. 8, 2024

Related U.S. Application Data

(60) Division of application No. 18/112,979, filed on Feb. 22, 2023, now Pat. No. 11,842,551, which is a
(Continued)

(51) Int. Cl.
*G08G 1/017* (2006.01)
*G06V 20/10* (2022.01)
(Continued)

(52) U.S. Cl.
CPC .......... *G06V 20/625* (2022.01); *G06V 20/176* (2022.01); *G06V 20/56* (2022.01); *G08G 1/0175* (2013.01)

(58) Field of Classification Search
CPC .... G06V 20/625; G06V 20/176; G06V 20/56; G06V 10/764; G06V 10/803;
(Continued)

(56) References Cited

U.S. PATENT DOCUMENTS 6,081,206 A * 6/2000 Kielland ............ G06Q 30/0284
                                                       194/902
6,459,386 B1   10/2002 Jones
(Continued)

FOREIGN PATENT DOCUMENTS

CA   2693911 A1 * 1/2009  ......... G06Q 30/0207
CA   3006878 A1 * 6/2017  ............. G06T 7/292
(Continued)

OTHER PUBLICATIONS

Automatic License Plate Recognition | autoChalk | Tannery Creek Systems, Website accessed on Feb. 22, 2022. <https://tannerycreeksystems.com> (previously cited and submitted in related U.S. Appl. No. 18/112,979).
(Continued)

*Primary Examiner* — Carol W Chan
(74) *Attorney, Agent, or Firm* — Gardella Alciati

(57) ABSTRACT

In an illustrative embodiment, systems and methods for automatically identifying positions of objects of interest using a vehicle-mounted sensor apparatus include obtaining images captured by imaging sensor(s) of the sensor apparatus during a time interval and analyzing the images to detect objects of interest. On detecting an object of interest, the systems and methods may calculate a geographic position corresponding to the object of interest and store a data record including an identifier of the object of interest, the geographic position, and a timestamp. The objects of interest may include urban fixtures, advertising materials, and/or vehicles. The systems and methods may be applied to identifying parking violations.

18 Claims, 12 Drawing Sheets

Related U.S. Application Data continuation of application No. PCT/PL2023/000007, filed on Feb. 7, 2023.

(51) Int. Cl.
*G06V 20/56* (2022.01)
*G06V 20/62* (2022.01)

(58) Field of Classification Search
CPC ............... G06Q 2240/00; G06Q 10/10; G06Q 30/0284; G06Q 50/18; G06Q 50/26; G06Q 50/40; G08G 1/015; G08G 1/017; G08G 1/065; G08G 1/0175
See application file for complete search history.

(56) References Cited

U.S. PATENT DOCUMENTS

| | | | |
|---|---|---|---|
| RE38,626 E | | 10/2004 | Kielland |
| 7,355,527 B2 | | 4/2008 | Franklin et al. |
| 7,382,280 B2 | | 6/2008 | Long |
| 8,447,112 B2 | | 5/2013 | Paul et al. |
| 8,818,572 B1 | * | 8/2014 | Tofte .................... G05D 1/102 |
| | | | 701/4 |
| 9,064,406 B1 | | 6/2015 | Stevens et al. |
| 9,785,855 B2 | | 10/2017 | Gordo Soldevila et al. |
| 9,911,055 B2 | | 3/2018 | Kozitsky et al. |
| 10,068,146 B2 | | 9/2018 | Bulan et al. |
| 10,783,786 B2 | | 9/2020 | Franklin et al. |
| 2005/0073436 A1 | * | 4/2005 | Negreiro ................ G08G 1/017 |
| | | | 348/148 |
| 2006/0106504 A1 | | 5/2006 | Carpenter |
| 2012/0062395 A1 | | 3/2012 | Sonnabend et al. |
| 2019/0294889 A1 | * | 9/2019 | Sriram ............... G06V 10/7625 |

FOREIGN PATENT DOCUMENTS

| | | | | |
|---|---|---|---|---|
| CN | 105303825 A | * | 2/2016 | |
| CN | 111736613 A | * | 10/2020 | |
| CN | 114627451 A | * | 6/2022 | ............ B60W 30/09 |
| EP | 2320385 A1 | * | 5/2011 | ............. B67D 7/348 |
| EP | 2851840 A1 | * | 3/2015 | .......... G06K 9/00791 |

OTHER PUBLICATIONS

Curbside Enforcement Solutions | Conduent Transportation, Website accessed on Feb. 22, 2022. <https://transportation.conduent.com/enforcement-solutions/> (previously cited and submitted in related U.S. Appl. No. 18/112,979).

International Search Report and Written Opinion mailed on Oct. 20, 2023 in International Application No. PCT/PL2023/000007.

Peng, Ying, et al. "Survey on image and point-cloud fusion-based object detection in autonomous vehicles." IEEE Transactions on Intelligent Transportation Systems 23.12 (2022): 22772-22789.

\* cited by examiner

| street_id 722 | name 724 | session_0 726a | session_1 726b | session_2 726c | session_3 726d | session_4 726e | session_5 726f | session_6 726g |
|---|---|---|---|---|---|---|---|---|
| 6734cf3c-7550-4d04-9e98-cbba1425d00e | Ackerstraße | 64% | 58% | 61% | 64% | 56% | 69% | 58% |
| 8ca2d642-77ed-49b4-96a6-0ff558d10c99 | Ackerstraße | | | | | | | |
| 332289e5-55c0-4bea-9e07-780ef42eb977 | Ackerstraße | | | | | | | 67% |
| 48dd8ee9-a6ca-4ffe-b36e-d432f0d6cb53 | Ackerstraße | 84% | 84% | 96% | 80% | 80% | 80% | 80% |
| 1390f917-4c33-413c-b34c-8b067ac23c42 | Bruchstraße | 65% | 68% | 69% | 66% | 66% | 63% | 67% |
| 26a5bfdc-041d-4144-a7e0-2ac0e09dd252 | Bruchstraße | 84% | | 79% | 68% | 79% | 74% | |
| 434126a6b-cfe4-4bf4-8d67-9f05e81b988a | Bruchstraße | 88% | 83% | 81% | 92% | 84% | 92% | |
| 9b37fd96-b228-45b5-a0a9-adca2cba89b3 | Cranachplatz | 89% | | | | | | |
| ddd2bd43-80d8-47c8-bc06-45b61636db7a | Cranachstraße | 86% | | | 75% | 86% | 86% | |
| c18de7bd-fb7e-4aad-9e4b-311236cad168 | Cranachstraße | 100% | 100% | 100% | 100% | 100% | 100% | 100% |
| a704690c-fb99-4259-8410-ee0e-97484fb | Cranachstraße | 83% | 87% | 86% | 79% | 71% | 85% | 83% |
| 3eef49ad-d6b4-4378-b368-97b7705ae81a | Degerstraße | | | | | | | |
| a06e21f6-cee5-49ba-b7b2-feed224d748d | Degerstraße | 100% | 100% | 100% | 100% | 100% | 100% | |
| 8a5798db-b36b-4f90-b2ce-46dd56edff67 | Degerstraße | 100% | 100% | 100% | 100% | 100% | 100% | |
| 0a89506f-b861-44b7-b303-ab4411dd8984 | Degerstraße | 84% | 84% | 97% | 84% | 85% | 100% | 84% |
| 2c06a091-7d4f-402a-8e60-f5a26a35c916 | Degerstraße | 100% | 100% | 88% | 100% | 100% | 100% | 100% |
| 2449bb20-152d-44dc-a39e-a3d12473e760 | Dorotheenstraße | 56% | 56% | 67% | 78% | 77% | 78% | 78% |
| b162e929-ca33-4a16-83fb-ce91887f6f0c | Dorotheenstraße | 89% | 89% | 56% | 78% | 67% | 78% | 89% |
| 9f09cb32-1659-4229-8a78-795d0997fb5d | Dorotheenstraße | 100% | 100% | 100% | 100% | 100% | 14% | 29% |
| 4016afd5-8eb6-484e-acf8-f4f40f25f665 | Dorotheenstraße | 100% | 100% | 100% | 100% | | 100% | 100% |
| 2af9fa98-08ac-4ba6-9b48-e707f1e58a8c | Dorotheenstraße | 100% | 100% | 100% | 100% | 100% | 100% | 100% |
| c695335b-7553-4bb0-a327-935b7890772a | Dorotheenstraße | | | | | | | |
| 17b30676-f33a-4810-8327-6d460ed36db4 | Dorotheenstraße | 100% | 100% | 94% | 100% | 100% | 83% | |

728a Very low (< 50%)
728b Low (50% – 69%)
728c Medium (70% – 89%)
728d High (90% – 99%)
728e Very High (100% – 109%)
728f Not legally covered (> 109%)

FIG. 7B

SYSTEM AND METHODS FOR AUTOMATICALLY DETECTING OBJECTS OF INTEREST AND DETERMINING THEIR GEOGRAPHIC POSITIONS

RELATED APPLICATIONS

This application is a divisional of and claims priority to U.S. Non-Provisional application Ser. No. 18/112,979, entitled "System and Methods for Automatically Detecting Objects of Interest and Determining Their Geographic Positions," filed on Feb. 22, 2023 which is a continuation of and claims priority to International Application No. PCT/PL2023/000007, entitled "System and Methods for Automatically Detecting Objects of Interest and Determining Their Geographic Positions," filed Feb. 7, 2023. All above identified applications are hereby incorporated by reference in their entireties.

BACKGROUND

Parking fees in paid parking zones of major metropolitan areas are commonly checked every day by teams of inspectors, while tens of thousands if not over a hundred thousand vehicles circulate the city in search of a parking space. Oftentimes, visitors will park in violation of posted parking regulations, such as parking without paying a required fee, parking in a no-parking zone, or parking in a restricted (e.g., residents only, handicap only, etc.) parking zone. Due to low efficiency of pedestrian patrols, the metropolitan area invariably realizes lower than anticipated revenues from parking fees.

The inventors recognized a need for an automated, reliable system for enforcing parking regulations and for issuing tickets due to parking violations.

SUMMARY OF ILLUSTRATIVE EMBODIMENTS

In one aspect, the present disclosure relates to a mobile, digital system mounted on a vehicle which uses at least one positioning sensor, at least one camera, and at least one distance sensor to identify objects of interests and their geographic position at the time of identification. The system may be designed to perform sensor analysis and identification while the vehicle is in motion. The system may apply multiple classifiers to detect and classify object of interests, such as, in some examples, a vehicle's license plate, a traffic sign, and/or a commercial banner. The system may calculate, using sensor data from a GPS sensor and LIDAR sensor, precision positions for each object of interest (e.g., in World Geodetic System 1984 (WGS84) standardized format). The system may log, to a database, a record including an object of interest identifier, a position of the object of interest, and a time of detection.

In some embodiments involving objects of interest which may change their locations, such as the license plates of vehicles, the system may pass by each object of interest at least twice separated by a brief (e.g., under ten minutes, about the time to loop a city block in high traffic, etc.) time to document which objects of interest have not moved. The system, for example, may confirm that a particular object of interest has a current calculated position within a threshold distance of a prior calculated position. By matching a same license plate positioned in a same parking location, for example, the system may confirm that the vehicle with the identified license plate is parked, rather than in motion (e.g., just leaving).

In one aspect, the present disclosure relates to a method for automatically monitoring parking spaces and enforcing parking regulations. The method may be performed by a mobile, digital system mounted on a vehicle. The mobile system may include at least one positioning sensor, at least one camera, and at least one distance sensor to identify license plates and their geographic position at the time of identification.

In some embodiments, the method includes correlating positions of vehicles to a stored map of parking zones. The parking zones, in some examples, may include paid parking zones, free parking zones, limited time period (e.g., 30 minutes, 1 hour, 2 hours, etc.) free parking zones, no parking regions, and/or restricted parking regions (e.g., handicapped parking only, resident parking only, etc.). Further, the system may correlate positions of vehicles to parking spaces, such that the system may identify which vehicle is parked in which parking spot of a paid parking zone.

In some embodiments, the method includes identifying a parking violation and generating information needed for enforcement (e.g., ticketing) purposes. In some examples, the method may include identifying a vehicle is parked in a no-parking zone, has been parked in a paid parking area without paying, or has been parked in a paid parking area beyond a maximum parking time with payment. The method may include cataloging times of identification of the vehicle in the parking space, license plate information for the vehicle, and a photo of the vehicle in the parking space.

In one aspect, the present disclosure relates to a method for automatically generating parking analytics for a geographic region, such as an urban neighborhood. The method may be performed by a mobile, digital system mounted on a vehicle. The mobile system may include at least one positioning sensor, at least one camera, and at least one distance sensor to identify license plates and their geographic position at the time of identification.

In some embodiments, the method includes mapping and documenting existing parking spaces within the geographic region. For example, free parking spaces may be identified based on a length of "park-able" space in view of local parking regulations (e.g., distance from fire hydrants, distance from driveways or street corners, etc.).

In some embodiments, the method includes developing metrics related to utilization rate of existing parking spaces, such as percentage full per type of parking space (e.g., paid, free, handicapped, restricted access, etc.), percentage full per time of day (e.g., hourly, morning/afternoon/evening, etc.), and/or percentage full per parking zone (e.g., block or portion thereof). The method may include developing metrics related to driver usage behavior of parking spaces, such as, in some examples, average parking duration per parking zone and/or average parking duration per time of day. The method may include developing metrics related to dangerous parking violations (e.g., double parking, blocking fire hydrants, parking in bus loading zones, etc.). Further, the method may include developing metrics related to traffic searching for parking spaces.

In one aspect, the present disclosure relates to a method for measuring brand presence in a geographic region, such as a common traffic route. The method may be performed by a mobile, digital system mounted on a vehicle. The mobile system may include at least one positioning sensor, at least one camera, and at least one distance sensor to identify objects of interest (e.g., billboards, signs, stores, etc.) and their geographic position at the time of identification. Certain objects may be movable (e.g., signage on the exterior of a bus).

In some embodiments, the method includes developing metrics related to exposures per physical distance, exposures per time of day, and/or exposures relative to other objects of interest (e.g., number of cars driving by, pedestrian traffic, etc.).

Further, in some embodiments, the method includes developing metrics and other statistics related to parking availability and/or utilization in a given area. By capturing occupation of parking spaces over a period of time, metrics may be tracked such as, in some examples, a number of parking spaces available in a region, trends in space utilization based on day of the week and/or time of day, lengths of time certain parking spaces are typically occupied by a same vehicle, differentiation between parking used by locals and parking used by visitors, and/or space utilization based on parking attributes/special parking designations. In another example, real-time or near-real-time metrics may be developed, such as estimates of number of available parking spaces, identification of location(s) of likely available parking spaces, current traffic density in a given area, and/or level of traffic seeking parking in a given area.

In some embodiments, the method includes recognizing dangerous parking violations. The dangerous parking violations may be used for developing metrics and/or for assisting in real-time enforcement.

The foregoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 7A through FIG. 7C illustrate graphical displays of example analyses of parking metrics captured over time.

DETAILED DESCRIPTION OF ILLUSTRATIVE EMBODIMENTS

Figure 1:
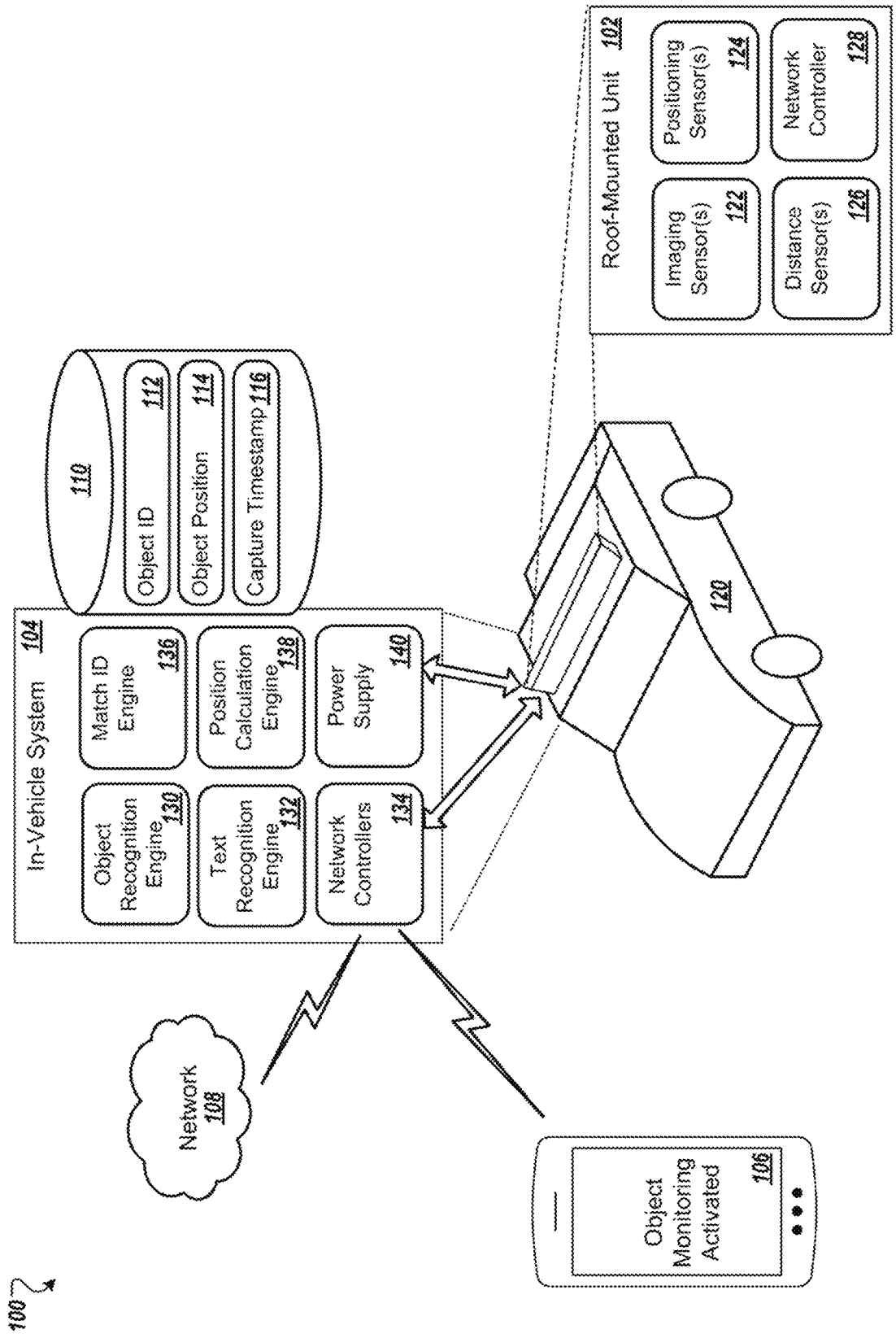
FIG. 1 is a block diagram of an example system for automatically detecting objects of interest and calculating their geographic positions.

The description set forth below in connection with the appended drawings is intended to be a description of various, illustrative embodiments of the disclosed subject matter. Specific features and functionalities are described in connection with each illustrative embodiment: however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

FIG. 1 is a block diagram of an example system 100 for automatically detecting objects of interest and calculating their geographic positions. The system, in some embodiments, includes a roof-mounted unit 102 for mounting on top of a vehicle 120. The roof-mounted unit 102, in some embodiments, is connected to an in-vehicle system 104 for obtaining power and for communicating data. In some embodiments, the in-vehicle system 104 is configured to communicate with a portable computing device 106, such as a smart phone or tablet computer. The portable computing device 106, for example, may provide an input/output (I/O) interface for a user interacting with the in-vehicle system 104. In some embodiments, a portion of the data collected by and/or calculated by the roof-mounted unit 102 and/or the in-vehicle system 104 may be provided to an external computing system via a network 108. The shared data, for example, may include a portion of the data collected in a non-volatile computer readable data store 110 of the in-vehicle system 104.

In some implementations, the roof-mounted unit 102 includes one or more imaging sensors 122 such as one or more digital camera devices. The imaging sensor(s) 122, for example, may include one or more color camera devices for identifying objects based in part on color. Further, the imaging sensor(s) 122 may include one or more monochromatic camera devices, for example to assist in night vision. The roof-mounted unit 102 may further include one or more illumination devices, such as spotlights, to assist in object identification at night. In some embodiments, one or more imaging sensors 122 are positioned on each of two or more surfaces of the roof mounted unit 102. For example, the roof-mounted unit 102 may have a first one or more imaging sensors 122 disposed to detect objects on a first side of the road and a second one or more imaging sensors 122 disposed to detect objects on a second side of the road. Further, the roof-mounted unit 102 may have a third one or more imaging sensors 122 disposed to detect objects in front of the vehicle 120 and/or a fourth one or more imaging sensors 122 disposed to detect objects behind the vehicle 120. Each of the at least one imaging sensor(s) 122 may provide image data to the in-vehicle system 104 for analysis.

The image data, in some embodiments, is provided via a network controller 128 of the roof-mounted unit 102 for receipt by a network controller 134 of the in-vehicle system 104. The network controllers 128 and 134, in one example, may be configured to communicate over a wired connection between the roof-mounted unit 102 and the in-vehicle system 104, such as an Ethernet connection or a Universal Serial Bus (USB) connection. The wired connection, in some implementations, is configured to provide both a data connection and a power connection to the roof-mounted unit 102. For example, the wired connection may supply power to the roof-mounted unit 102 from a power supply 140 of the in-vehicle system. In other embodiments, the power supply 140 provides power to the roof-mounted unit 102 by a separate wired connection. In further embodiments, the roof-mounted unit 102 includes a battery and separate charging unit. For example, the roof-mounted unit 102 may include a rechargeable battery and a solar collector for providing at least a portion of electrical charge for powering the roof-mounted unit 102.

In some embodiments, the network controllers 128 and 134 are configured to communicate over a wireless connection between the roof-mounted unit 102 an the in-vehicle system 104, such as a Bluetooth connection, a ZigBee connection, a Wireless LAN (WLAN) connection, or a Wi-Fi connection. In other embodiments, a wireless network controller of the portable computing device 106, such as a Bluetooth connection, Wi-Fi connection, or cellular connection, is used for transferring data between the roof-mounted unit 102 and the in-vehicle system 104.

In some implementations, the in-vehicle system 104 includes an object recognition engine 130 configured to analyze the image data captured by the imaging sensor(s) 122 of the roof-mounted unit 102 to identify one or more objects of interest. The object recognition engine 130, in some examples, may be configured to identify vehicles, vehicle license plates, advertising banners, and/or urban fixtures (e.g., traffic signs, street signs, etc.). The object recognition engine 130, for example, may execute one or more machine learning classifiers trained to identify particular types of objects of interest, such as machine learning classifiers trained to identify various types of license plates.

Further, the in-vehicle system 104, in some implementations, includes a text recognition engine 132 for identifying text printed on an object of interest, such a license plates and/or advertising banners. The text recognition engine 132, for example, may translate text components of the image of a license plate (e.g., the characters of the license plate identifier, the date printed on the renewal sticker, etc.).

In some implementations, the in-vehicle system 104 logs an object identifier 112 for the object. The object identifier, in some examples, may include a type of object (e.g., an advertisement poster on a bus stop structure or other urban fixture, etc.), a unique identifier of the object (e.g., the type of object concatenated with a unique string, the state/province/country and text of a vehicle license plate, etc.). The object identifier 112 may be associated with a capture timestamp 116 representing a time or time and date of identification of the object of interest.

In some implementations, the roof-mounted unit 102 includes one or more positioning sensors 124 for determining geographic position. The positioning sensor(s) 124, for example, may be configured to determine a precise position and heading of the vehicle 120, thereby providing the ability (e.g., to a position calculation engine 138 of the in-vehicle system 104) to calculate a position of each object of interest, using one or more distance sensors 126. The positioning sensor(s) 124, for example, may include a multichannel unit having at least two antennas configured to receive signals from various global navigation satellite system (GNSS) constellations, such as global positioning system (GPS) satellites, BeiDou Navigation Satellite System (BDS) satellites, and/or Galileo satellites. Further, the positioning signals collected by the positioning sensor(s) 124, in some embodiments, are enhanced with information received via real-time kinematic (RTK) and/or real-time network (RTN) corrections to refine the position data. For example, the RTK and/or RTN corrections may be received by network controller 134 (e.g., a cellular network controller) and processed along with the positioning sensor data by the in-vehicle system 104. The correction data, for example, may be provided to the position calculation engine 138 for analysis.

In some implementations, the roof-mounted unit 102 provides positioning data collected by the positioning sensor(s) 124 to the in-vehicle system 104 via the communication link established by the network controller 128 and the network controller 134. The positioning data, for example, may be provided to the position calculation engine 138 for analysis.

In some implementations, the roof-mounted unit 102 includes one or more distance sensor(s) 126 for determining a distance between the vehicle 120 and each object of interest. The distance sensor(s) 126, for example, may include one or more light detection and ranging (LIDAR) sensors. In some embodiments, each distance sensor 126 corresponds to one or more imaging sensors 122. For example, the roof-mounted unit 102 may include a separate distance sensor mounted to detect distances from each side of the road, in front of the vehicle 120, and/or behind the vehicle 120.

In some implementations, the roof-mounted unit 102 provides distance data collected by the distance sensor(s) 126 to the in-vehicle system 104 via the communication link established by the network controller 128 and the network controller 134. The distance data, for example, may be provided to the position calculation engine 138 for analysis.

In some implementations, the position calculation engine 138 applies the positioning data and the distance data collected by the roof-mounted unit 102 and calculates a position for each object of interest identified by the object recognition engine 130. The positions may be stored in correspondence with each object identifier 112 as object positions 114.

In some implementations, the in-vehicle system 104 includes a match identification engine 136 to match previously identified objects of interest with presently identified objects of interest. The match identification engine 136, for example, may identify a same license plate object captured at a prior time. The match identification engine 136 may further determine whether the object is positioned in a same location as previously identified. For example, the match identifier engine 136 may compare two records in the data store 110 to determine that an object having a particular object identifier 112 has a prior position 114 within threshold distance of a current position 114. Upon this determination, for example, the match identification engine 136 may conclude that the vehicle having the matched license plate has remained in a particular parked position since the prior capture. Further, the match identification engine 136 may link the records and/or combine the records (e.g., append the newer timestamp to the older record, mark the older record with a designation of "confirmed parked" and remove the newer record, etc.).

Figure 2A:
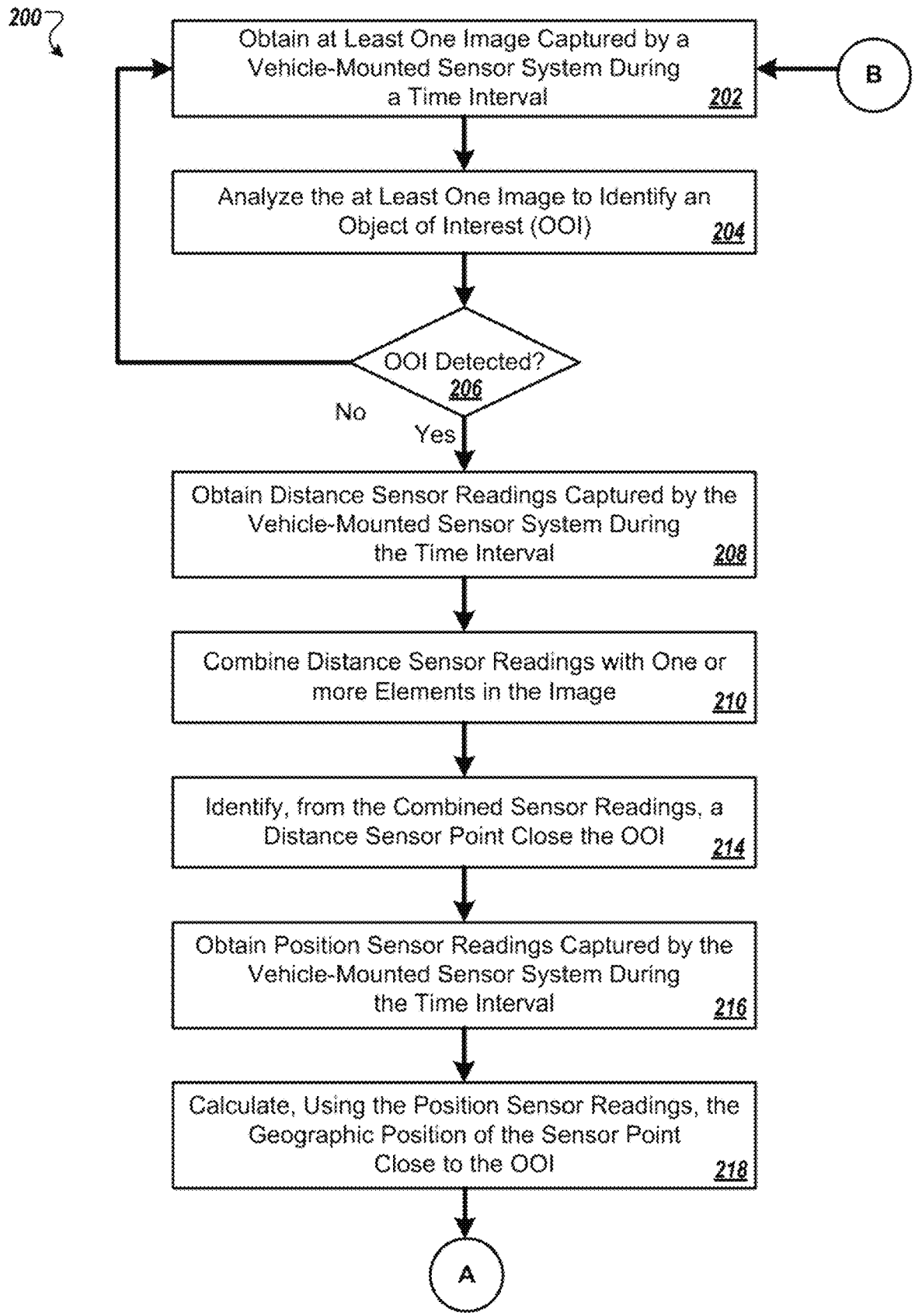
FIG. 2A and FIG. 2B illustrate a flow chart of an example method for calculating geographic positions of objects of interest and determining whether they have remained in place over time.
Figure 2B:
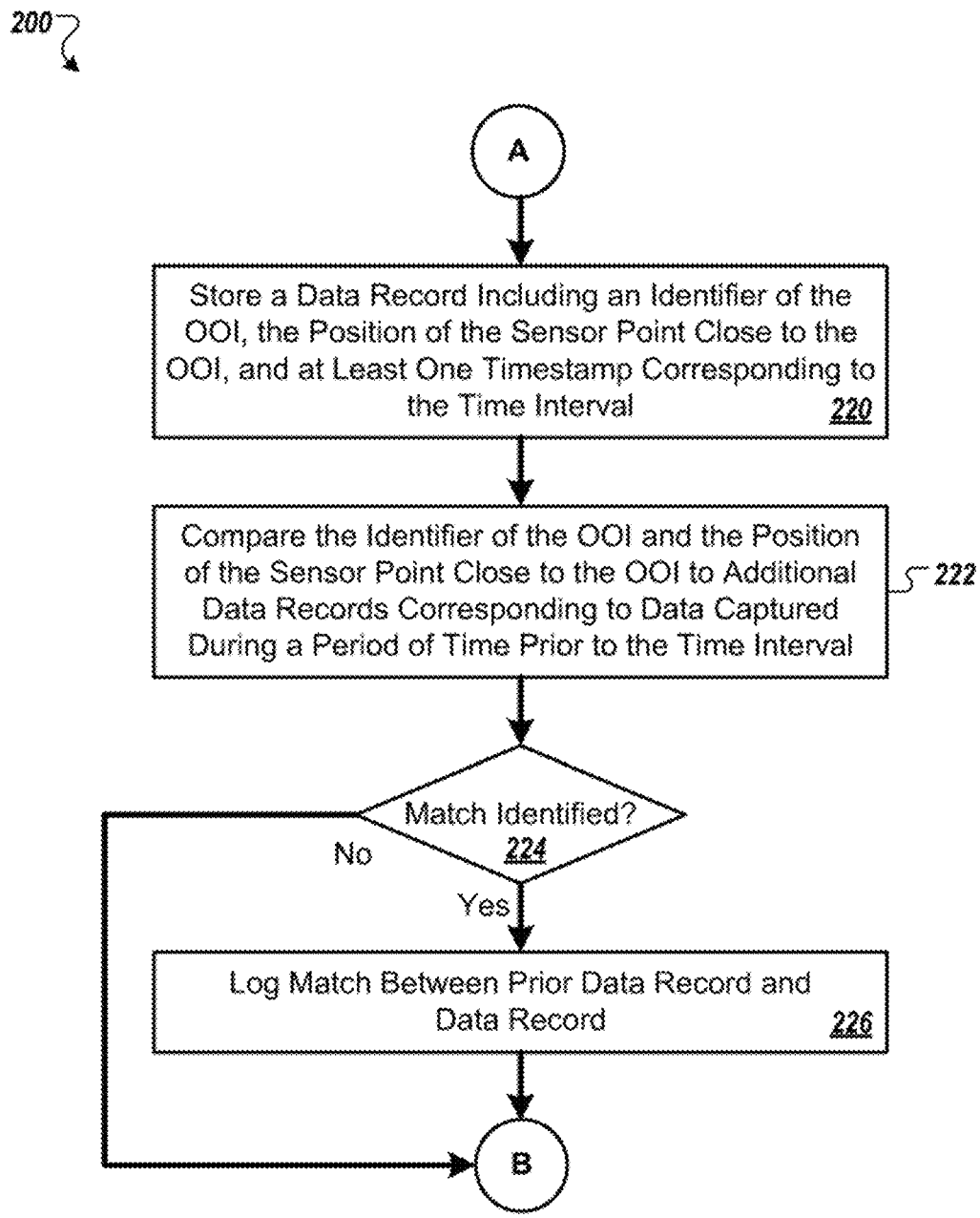

Turning to FIG. 2A and FIG. 2B, a flow chart illustrates an example method 200 for calculating positions of objects of interest and determining whether they have remained in place over time. The method 200, for example, may be performed by portions of the system 100 of FIG. 1.

In some implementations, the method 200 begins with obtaining at least one image captured by a vehicle-mounted sensor system during a time interval (202). The at least one image, for example, may be captured by at least one of the imaging sensors 122 of the roof-mounted unit 102 described in FIG. 1.

Figure 3A:
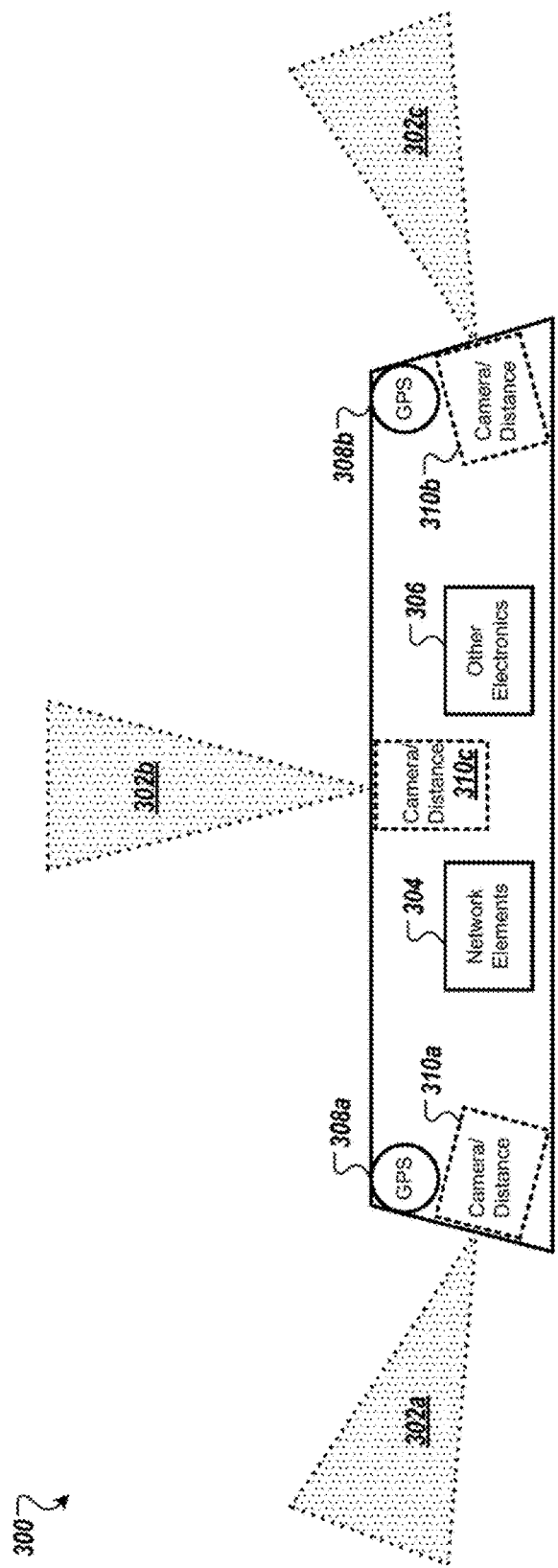
FIG. 3A and FIG. 3B are block diagrams of an example mobile system for mounting on a vehicle.
Figure 3B:
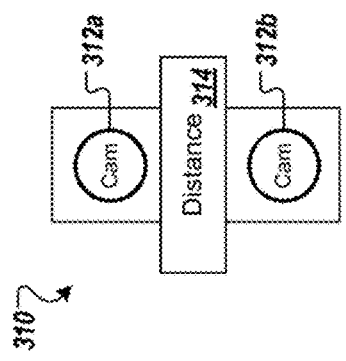

Turning to FIG. 3A and FIG. 3B, for example, the at least one image may be captured by a camera/distance sensor unit 310 of a roof-mounted unit 300, such as the roof-mounted unit 102 of FIG. 1. As illustrated in FIG. 1, a top view of the roof-mounted unit 300 illustrates three camera/distance sensor units 310, including a left camera/distance sensor unit 310a, a right camera/distance sensor unit 310b, and a forward camera/distance sensor unit 310c. Each camera/distance sensor unit 310 is illustrated as having a corresponding focal range 302.

In some embodiments, each camera/distance sensor unit 310, as illustrated in FIG. 3B, includes an upper camera sensor 312a, a lower camera sensor 312b, and a distance (e.g., lidar) sensor 314. In some implementations, the upper camera sensor 312a and the lower camera sensor 312b are a same type of imaging sensor, such as a full color imaging sensor. For example, each camera may be directed in a different offset, thereby capturing a greater total range 302. In other implementations, the upper camera sensor 312a is different than the lower camera sensor 312b. In some examples, using different camera sensors may be beneficial based on lighting, weather, and/or type of object of interest. In a particular example, a monochromatic camera may be used in low light circumstances, and a full color camera may be used in daylight. A photosensor of the camera/distance sensor unit 310 or the roof-mounted unit 300 may be used to select between the cameras 312a, 312b.

In some implementations, the image data captured by one or more of the camera/distance sensor units 310a-c is transferred externally for analysis. For example, the data may be transferred via network elements 304, such as the network controller 128 described in relation to FIG. 1. In other implementations, the image data may be analyzed by processing components of the roof-mounted unit 300, such as a set of other electronics 306.

In some implementations, the at least one image is analyzed to identify an object of interest (204). The object recognition engine 130 of the in-vehicle system 104, for example, may analyze the image(s) to identify the object of interest.

In some implementations, the method 200 continues to obtain images (202) and analyze the images (204) until an object of interest is detected (206). For example, during operation, the method 200 may capture images at a frequency of multiple frames per second (FPS), such as twenty frames per second. The frequency, in some embodiments, is user selectable. For example, settings for the capture frequency of the roof-mounted unit 102 may be adjusted through an application executing on the portable computing device 106 of FIG. 1.

When an object of interest is detected (206), in some implementations, distance sensor readings captured by a vehicle-mounted sensor system during the time interval are obtained (208). The distance sensor readings, for example, may be captured by one or more distance sensors 126 of the roof-mounted unit 102 of FIG. 1 and/or the distance sensor 314 of one of the camera/distance sensor units 310 of the roof-mounted unit 300 of FIG. 3A and FIG. 3B. In some implementations, the distance data captured by one or more of the camera/distance sensor units 310a-c is transferred externally for analysis. For example, the data may be transferred via network elements 304, such as the network controller 128 described in relation to FIG. 1. In other implementations, the distance data may be analyzed by processing components of the roof-mounted unit 300, such as by a portion of the set of other electronics 306.

Figure 4A:
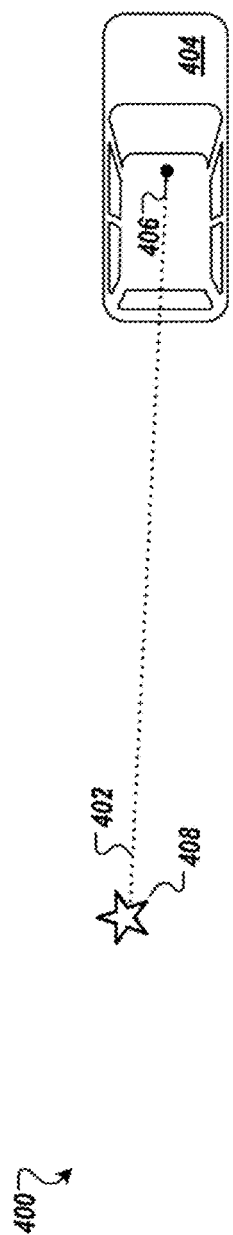
FIG. 4A through FIG. 4C are block diagrams illustrating steps of position calculation using sensor data captured by the example mobile system of FIG. 3A and FIG. 3B.

In some implementations, the distance sensor readings are combined with one or more elements of the image (210). In some embodiments, combination is achieved in part through time synchronization of the image sensor(s) with the distance sensor(s) such that data frames from individual sensors may be grouped together for a discrete time interval (T). The sensors may be synchronized, for example, using a pulse per second (PPS) signal issued by a positioning sensor (e.g., GPS sensor) of the roof-mounted unit. The length of the time interval T may range, for example, up to the inverse of the sensing frequency. In illustration, for a 20 Hz sensing frequency, the time interval T may be up to 50 milliseconds. Using the data corresponding to the time interval T, in some embodiments, three-dimensional distance signal points (e.g., lidar points) may be projected into a two-dimensional image matrix. For explanation purposes, FIG. 4A provides a diagram 400 depicting the overlay of a lidar trajectory 402 from the rooftop unit 408 to a position of a vehicle 404.

In some implementations, a distance sensor point close to the object of interest is identified from the combined sensor readings (214). In one example, the distance sensor point may be identified as a lidar point central to the vehicle having a license plate object of interest, such as a central location of a bounding box encompassing the vehicle. For example, as illustrated in FIG. 4A, a reference point 406 is generally located in a central location with reference to the vehicle 404. In another example, the distance sensor point is identified as the lidar point closest to a license plate detected in the image. The bounding box may begin with a first size (e.g., tighter to the area of the vehicle). The bounding box may then be expanded, for example by up to a threshold amount or up to another predetermined threshold, to identify the distance sensor point close to the object of interest. The threshold may be selected to avoid a significant decrease in quality of the distance measurement.

In some implementations, position sensor readings captured by the vehicle-mounted sensor system during the time interval are obtained (216). The position sensor readings, for example, may be captured by the one or more positioning sensors 124 of the roof-mounted unit 102 of FIG. 1. Turning to FIG. 3A, the position sensor readings may be captured by a set of GPS antennas 308a and 308b of the roof-mounted unit 300. In some implementations, the position data captured by the GPS sensors 308a, 308b is transferred externally for analysis. For example, the data may be transferred via network elements 304, such as the network controller 128 described in relation to FIG. 1. In other implementations, the position data may be analyzed by processing components of the roof-mounted unit 300, such as by a portion of the set of other electronics 306.

Figure 4B:
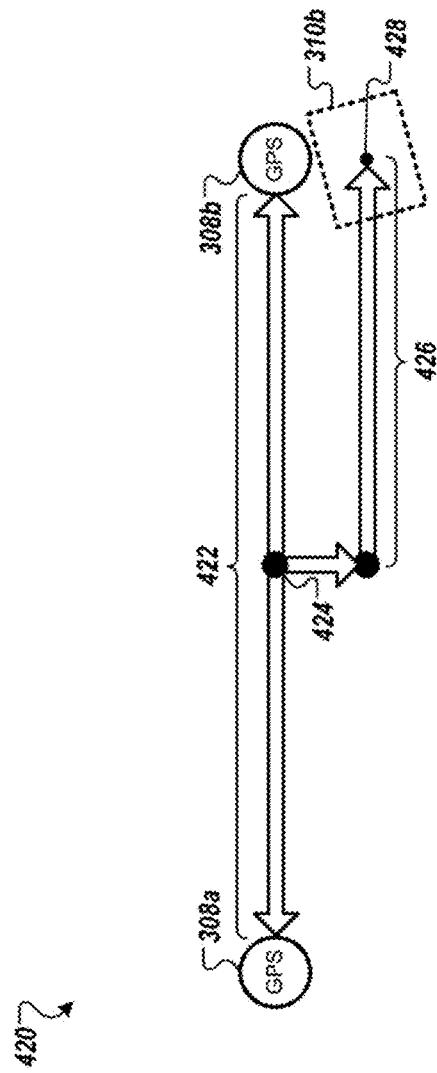
Figure 4C:
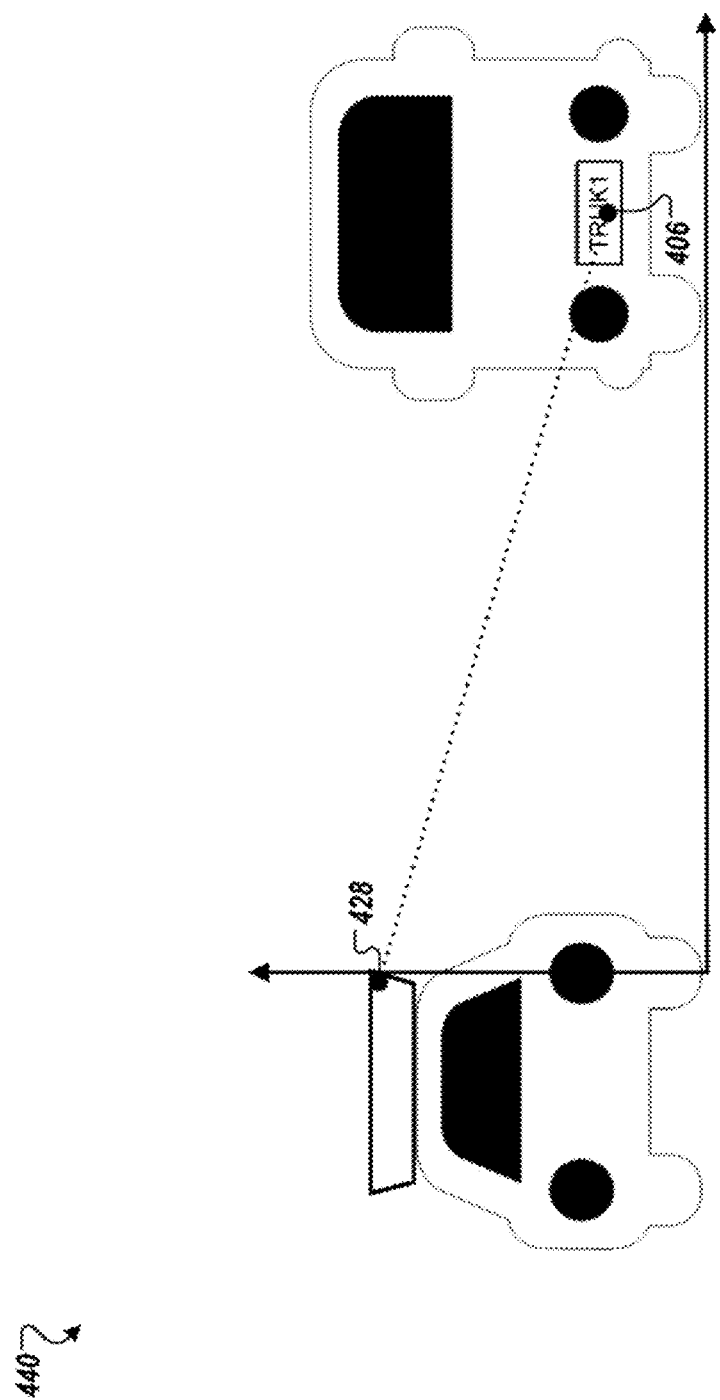

Returning to FIG. 2A, in some implementations, a geographic position of the sensor point close to the object of interest is calculated using the position sensor readings (218). The position calculation engine 138 of the in-vehicle system 104 of FIG. 1, for example, may calculate the geographic position of the sensor point. Turning to FIG. 4B, in some embodiments, positions of two GPS antennas 308a and 308b are determined. Using the two points, a geographic position of a midpoint 424 of a distance 422 between the two GPS antennas 308a, 308b may be calculated. Next, using a known distance 426 from the midpoint 424 to a reference point 428 (e.g., midpoint or central point) of the camera/position sensor unit 310 used to capture the image and distance readings (e.g., the camera/position sensor unit 310b as illustrated), a geographic position of the reference point 428 may be calculated. Finally, the geographic position of the object of interest may be calculated by adding the distance to the object to the position of the reference point 428. For example, as illustrated in a block diagram 440 of FIG. 4C, the distance between the reference point 428 and the distance sensor data point 406 (derived in relation to FIG. 4A) may be calculated.

Turning to FIG. 2B, in some implementations, the method 200 continues with storing a data record including an identifier of the object of interest, the position of the sensor point close to the object of interest, and at least one timestamp corresponding to the time interval (220). The geographic position of the object of interest, for example, may be stored as the object position 114 corresponding to the object identifier 112 referencing the object of interest, as described in relation to FIG. 1. The timestamp, for example, may reference a time within the time interval T, as described above in relation to operation 210.

In some implementations, the identifier of the object of interest and the position of the sensor point close to the object of interest is compared to additional data records corresponding to data captured during a period of time prior to the time interval (222). In enforcing parking regulations, for example, multiple "drive throughs" may be conducted to recognize the same objects of interest (e.g., license plates). In capturing at least two recognitions of a same object of interest at different points in time, each recognition being in a geographic location within a distance smaller than a predetermined error tolerance, the object of interest may be determined to have remained in the same place (e.g., a parked vehicle). The period of time, in some examples, may be based in part on a route followed for traffic regulation enforcement. For example, in a circuitous route that is traversed every 6.5 minutes (or longer depending on traffic conditions), the period of time may be entries from 6 minutes prior or earlier in time. The predetermined error tolerance, for example, may be based on an estimated minimum distance between objects of interest. For example, motorcycles parked at an angle side-by-side in street parking may have license plates separated by at least approximately 36 inches/92 centimeters. In some examples, the error tolerance may include distance differences up to about 6 inches/15 centimeters, up to about 12 inches/30 centimeters, or up to about 18 inches/45 centimeters.

In some implementations, if a match is identified (224), a match is logged between the prior data record and the data record (226). The match may be logged, for example, in the data store 110 (e.g., an indicator that the object of a given object identifier 112 is parked). Further, the match may be provided, via the network controller 134, to the network 108 and/or the portable computing device 106 for analysis in relation to parking payment and/or ticketing.

Conversely, in some embodiments, if a different object (e.g., a different license plate) is identified in a particular location at a later time, entries regarding the previously identified object in that particular location are cleared from the data records in the data store 110.

In some implementations, whether or not a match is identified (224), the method 200 continues with obtaining images (202).

Although described as a particular series of operations, in other embodiments, more or fewer operations may be included in the method 200. For example, in addition to detecting an object of interest (204), in some embodiments, the detected object may be analyzed to identify a text component, for example as described in relation to the text recognition engine 132 of FIG. 1. In another example, for certain use scenarios, such as mapping public infrastructure and/or identifying imprints of an advertisement campaign, the operations of comparing (222) and identifying matches (224) to log (226) may be removed from the method 200. Further, in some embodiments, certain operations of the method 200 may be performed in a different order and/or concurrently. For example, the distance sensor readings may be combined with the element(s) in the image (210) in parallel with analyzing the at least one image (204). Other modifications of the method 200 are possible.

In addition to identifying objects of interest at various positions, in some implementations, systems and methods described herein may capture additional data corresponding to the positions registered within the data records. In one example, the vehicle-mounted sensor system may include one or more air quality sensors configured to capture air quality data corresponding to the times and positions of object of interest analysis. In this way, a time- and location-based mapping of air quality may be captured throughout a defined area. In another example, the vehicle-mounted sensor system may include one or more wireless antennas for interrogating passive data tags such as RFID tags and processing circuitry to analyze tag data captured by the one or more wireless antennas. The passive data tags, in some examples, may correspond to parking permit hang tags and/or electronic toll collection transponders.

Figure 5:
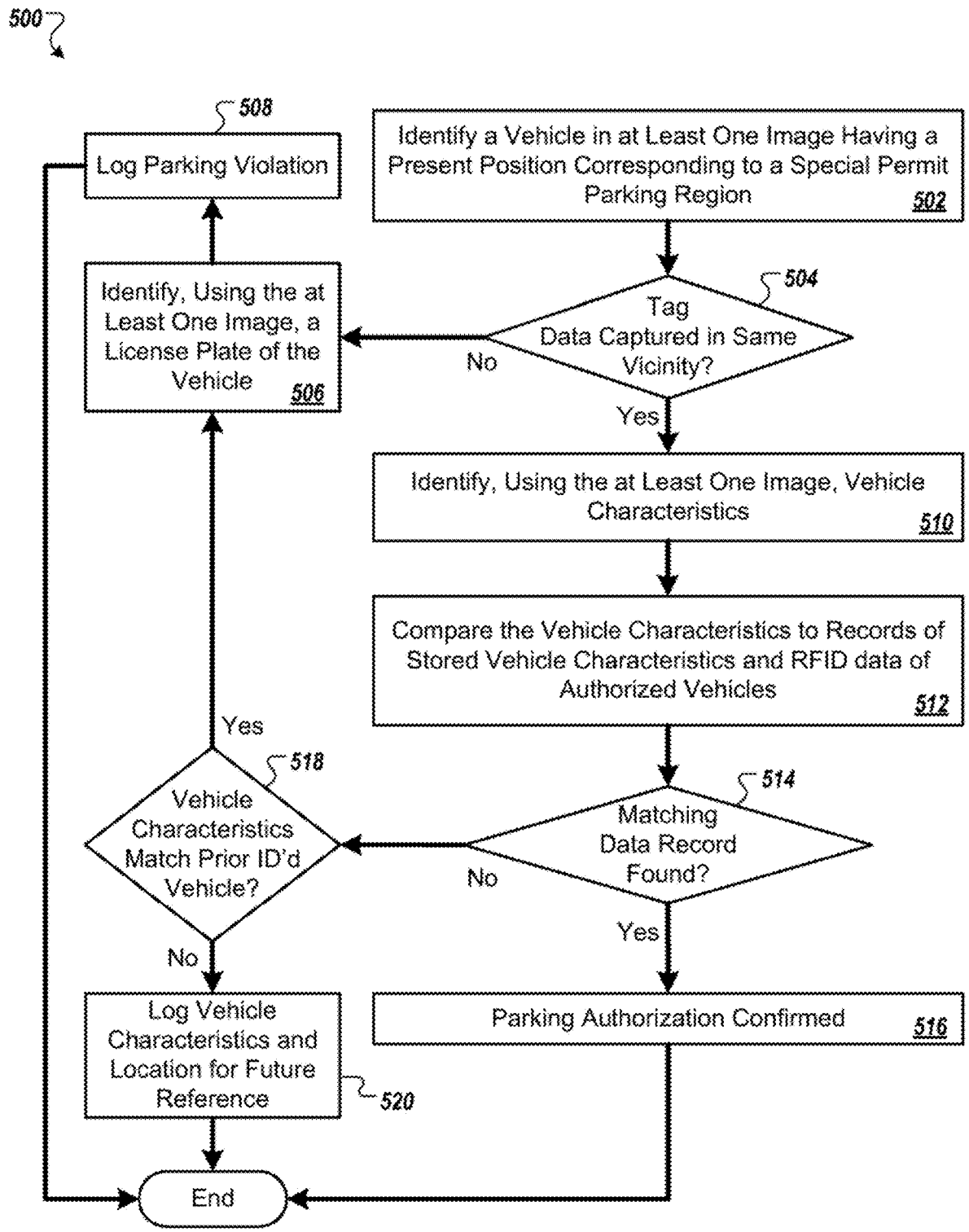
FIG. 5 is a flow chart of an example method for identifying parking violations in a special permit parking region.

In some jurisdictions, capturing full license plate information without having an initial suspicion (e.g., reason for believing that the vehicle is in violation of an ordinance) is not allowed. In such jurisdictions, RFID hang tags may be used to establish parking authorization. However, due to the diffuse and unprecise signal of RFID tags, matching RFID tag data recognized in a parking area including multiple vehicles parked next to each other to a particular vehicle can be difficult. In this case, the diffuse and unprecise signal of the RFID tags may be combined with captured image data of descriptive, but not individually unique, information regarding a vehicle to support identification of violators while maintaining the requisite privacy demanded by the jurisdiction. Turning to FIG. 5, an example method 500 for identifying parking violations of vehicles parked in a special permit parking region is provided. The method 500, for example, may be performed by the in-vehicle system 104 of FIG. 1. The method 500, in some embodiments, is performed as an extension of the method 200 of FIG. 2A and FIG. 2B.

In some embodiments, the method 500 begins with identifying a vehicle in at least one image having a present position corresponding to a special permit parking region (502). The vehicle, for example, may be recognized by the object recognition engine 130 of FIG. 1. For example, the vehicle may be recognized in a manner similar to that described in relation to the operations 202 to 218 of the method 200 of FIG. 2A. The special permit parking region, in some examples, may include a disability parking region, a resident only parking region, an employee only parking region, or a student/faculty parking region. The parking region may include two or more adjacent parking spots designated as special permit parking only.

In some implementations, passive tag data is scanned for the same vicinity as the identified vehicle (504. For example, RFID tag data or other passive tag data may be captured by a wireless antenna such as one or more RFID antennas. The wireless antenna, for example, may be included in the roof-mounted unit 102 of FIG. 1 and/or the roof-mounted unit 300 of FIG. 3A.

In some implementations, if passive tag data is not captured in the same vicinity as the identified vehicle (504), a license plate of the vehicle is identified (506). The license plate may be identified, for example, by the text recognition engine 132 of the in-vehicle system 104 of FIG. 1. Without associated tag data, for example, the vehicle may be assumed to be in violation of the special permit parking region.

In some implementations, a parking violation is logged in relation to the vehicle (508). The parking violation, for example, may be logged with a municipality to issue a parking ticket. In the example of a private parking region, the managing entity may be alerted of the unauthorized vehicle such that the vehicle may be towed from the premise.

In some implementations, if passive tag data is captured in the vicinity of the vehicle (504), vehicle characteristics are identified for the identified vehicle (504). Due to the diffuse nature of the passive tag data, the passive tag data may correspond to the identified vehicle, a vehicle parked next to the identified vehicle, a vehicle parked adjacent to the identified vehicle, or a vehicle driving by the interrogating antenna. Thus, to uniquely match the RFID data to the identified vehicle, characteristics of the identified vehicle may be identified. The vehicle characteristics, in some examples, may include partial license plate information (e.g., one or more initial alphanumeric characters and/or one or more terminal alphanumeric characters), a license plate type (e.g., car, motorcycle, fireman, police, war veteran, disability, etc.), a license plate jurisdiction (e.g., state, province, country, etc.), a vehicle body style (e.g., compact, sedan, sport utility vehicle, van, etc.), a vehicle color, a vehicle make, a vehicle model, a window sticker, a bumper sticker, and/or a vehicle color. The vehicle characteristics used for identifying the vehicle, for example, may be specific to a particular area (e.g., selected by the municipality) and/or the particular permit parking type (e.g., characteristics of vehicles used by disabled persons may differ generally in nature from vehicles used by students, etc.). Further, the vehicle characteristics may vary by region (e.g., characteristics generally recognizable in snowy conditions may be preferable in northern climates). In an example embodiment, the vehicle characteristics may include the one or more leading alphanumeric characters of the license plate and one or more terminating alphanumeric characters of the license plate. In illustration, for the license plate 457GBP, the vehicle characteristics may be "4\*\*\*BP".

In some implementations, the vehicle characteristics are compared to records of stored vehicle characteristics and RFID data of the authorized vehicles (512). The vehicle characteristics, for example, may be registered by a driver in correspondence to a particular hang tag or RFID badge allocated to the driver. The driver, in one example, may enter the characteristics into a parking kiosk available near the parking space. In another example, the driver may enter the characteristics into a mobile device app or web browser application to register the vehicle characteristics in correspondence to the driver's hang tag or RFID badge. The characteristics, in a particular example, may be derived through the mobile app from an image of the vehicle taken by the driver. The comparison, in some embodiments, is performed by the match ID engine 136 of the in-vehicle system 104 of FIG. 1.

In some implementations, if a matching data record is found, parking authorization is confirmed (516). The parking authorization, for example, may be sent to a user account associated with the mobile device app or browser-based application used by the driver to submit the vehicle characteristics.

In some implementations, if a matching data record is not found (514), it is determined whether the vehicle characteristics match a vehicle previously identified as being positioned in this parking spot (518). For example, the information may have been logged previously as described in relation to operation 506 of the method 500. The previous identification, for example, may have been performed during a previous round of inspection using a roof-mounted unit and in-vehicle system such as the roof-mounted unit 102 and in-vehicle system 104 of FIG. 1.

If the vehicle characteristics do not match a vehicle previously identified as being positioned in this parking space (518), in some implementations, the vehicle characteristics and location are logged for future reference (520). For example, the vehicle characteristics and location may be stored in the data store 110, where the vehicle characteristics are stored as the object ID 112, along with the location of the parking space as the object position 114 and a current time as the capture timestamp 116.

If, instead, the vehicle characteristics do match a vehicle previously identified as being positioned in the parking space (518), in some implementations, the license plate of the vehicle is identified (506) and the parking violation is logged (508).

Although described in relation to a particular series of operations, in other implementations, the operations of the method 500 may vary. In some embodiments, the method 500 includes more or fewer operations. For example, prior to comparing the vehicle characteristics to the records (512), if no other vehicle is parked in a nearby permit-only parking space, the RFID data may be assumed to correspond to the parked vehicle and the parking authorized based on the RFID data alone. The distance between the parked vehicle and any other vehicle parked in a permit-only parking space, for example, may be set to a predetermined threshold, such as, in some examples, three or four meters. In some embodiments, certain operations of the method 500 are performed in a different order, and/or certain operations of the method 500 are performed in parallel. For example, prior to looking for a data record matching the vehicle characteristics and RFID data (514), it may be determined whether the same vehicle had been previously identified in the same parking space (518). Other modifications of the method 500 are possible while remaining within the scope and spirit of the method 500.

Figure 6A:
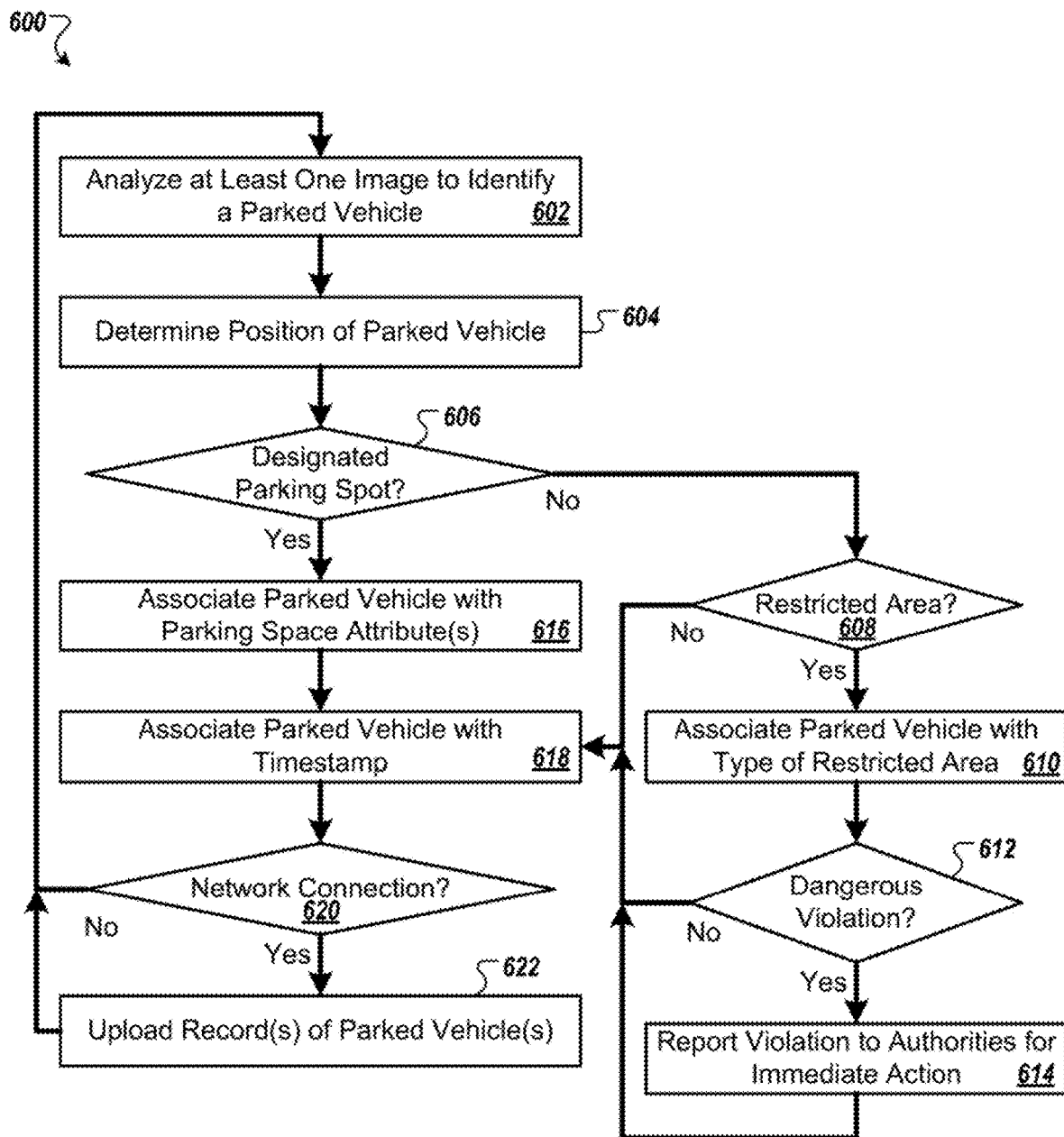
FIG. 6A illustrates a flow chart of an example method for analyzing attributes related to a parked vehicle for statistical and/or enforcement purposes.

FIG. 6A illustrates a flow chart of an example method 600 for collecting parking utilization data using a mobile system for recognizing objects of interest such as the system 100 of FIG. 1. The method 600, for example, may be performed at least in part by the in-vehicle system 104 of FIG. 1 to enhance the information collected when logging information to the data store 110. Further, at least a portion of the method 600 may be performed by a remote computing system available to the in-vehicle system 104 and/or the portable computing device 106 via the network 108.

In some implementations, the method 600 begins with analyzing at least one image to identify a parked vehicle (602). For example, the image may be analyzed as described in relation to operations 202-206 of FIG. 2A.

In some implementations, a position of the parked vehicle is determined (604). For example, the position may be determined as described in relation to operations 208-218 of FIG. 2A.

In some implementations, it is determined whether the position corresponds to a designated parking space (606).

In some embodiments, a designated parking space (or, conversely, a "no parking" space) is recognized based at least in part on recognizing another object of interest in one or more images captured of the parked vehicle. In some examples, a parking space identification sign, a parking meter, a "no parking zone" sign, a fire hydrant, a handicap only parking sign, a "tow zone" sign, a bus stop sign, a public transportation shelter, and/or a parking rules sign (e.g., length of time, time of day, etc.) may be recognized from image analysis. For example, the object recognition engine 130 of the in-vehicle system 104 of FIG. 1 may recognize parking signage corresponding to one or more parking spaces and/or parking prohibited regions. Further, in the event of a written sign (e.g., no parking, parking rules, etc.), the text recognition engine 132 of the in-vehicle system 104 of FIG. 1 may analyze the characters printed on the parking sign to determine parking guidelines (attributes) associated with the parking space.

In some embodiments, a designated parking space is recognized based at least in part on a database or other set of records identifying areas zoned as designated parking spaces. The records, for example, may include position data (e.g., a central location, a boundary, etc.) corresponding to one or more parking spaces. The position of the parked vehicle, for example, may be used to match the vehicle's location with a pre-registered parking space or parking available region.

In some implementations, if the position of the vehicle does not match with a designated parking spot (606), it is determined whether the vehicle is parked in a restricted area (608). As identified above, in some examples, restricted parking areas can include areas having restriction signage (e.g., tow zone, no parking zone), areas having objects associated with parking restrictions (e.g., bus shelter, fire hydrant), and/or limited availability parking spaces (e.g., certain times of day, certain days of the week, etc.). Further, in some embodiments, restricted areas may be designated in a database or set of records identifying areas zoned as restricted from parked vehicles. The areas, in some examples, can include loading areas, emergency vehicle only parking spaces, fire zones, crosswalks, and/or sloped access regions for people with disabilities to move between the street and the sidewalk. The position of the parked vehicle, for example, may be used to match the vehicle's location with a restricted parking space or region.

In some implementations, if the vehicle is determined to be parked in a restricted area (608), the parked vehicle is associated with a type of restricted area (610). For example, in a table of records or database of parked vehicles, certain records may include identification of a parked vehicle as well as the type of restricted area the vehicle is parked in. The type of restricted area, in some examples, may include a limited availability parking space (e.g., limited in times/days, limited to certain types of vehicles such as emergency vehicles, etc.), an illegal parking region (e.g., fire zone, crosswalk, bus stop, etc.), and/or a no parking zone (e.g., loading zone, region of street designated as no parking zone, etc.).

In some implementations, if the type of restricted area is considered to be a dangerous violation (612), the violation is reported to authorities for immediate action (614). A dangerous violation, in some examples, can include blocking pedestrian (and, in particular, disabled) traffic routes, blocking public transportation access, and/or blocking fire hydrants. Reporting the violation can include sending an electronic message to a police or traffic enforcement agency, issuing a pre-recorded telephone call to a police or traffic enforcement agency, or submitting a report through an application programming interface (API) of an enforcement agency. The report, for example, may include a GPS location or map (e.g., nearest address, nearest intersection, etc.) location proximate to the vehicle. Further, the report may include at least one image of the parked vehicle, a license plate of the vehicle, a vehicle description, and/or an identification of the type of restricted area.

In some implementations, the parked vehicle identified to be in a designated parking spot (606) is associated with one or more parking space attributes of the parking space (616). For example, in a table of records or database of parked vehicles, certain records may include identification of a parked vehicle as well as one or more attributes of the parking space. The attributes, in some examples, may include disabled parking space designation, resident-only parking space designation, member-only parking space designation (e.g., students of a university, employees of a business, clients of a business, etc.), electrical vehicle parking designation, compact vehicle parking designation, emergency vehicle parking designation, limited availability parking designation (e.g., one hour parking, two hour parking, parking only between certain designated hours, parking only on certain days, etc.), visitor-only parking space designation (e.g., visitors of a business, landmark, public recreation area, etc.), and/or motorcycle only parking space designation.

In some implementations, whether or not the vehicle is parked in a designated parking space (606), the parked vehicle is associated with a timestamp (618). The timestamp, for example, may be applied to the data record of the identified vehicle as described in relation to operation 220 of FIG. 2B.

In some implementations, if a network connection is available (620), one or more records of parked vehicles, including the subject parked vehicle, are uploaded to a remote computing system (622). The records, for example, may be uploaded to a cloud-based server for combination with records captured by other mobile systems within a vicinity, such as a particular city or borough. The records, in some examples, may include one or more of the following pieces of information in addition to the position (or parking space identifier), the attribute(s), and/or the type of restricted area: a vehicle identifier such as a partial or complete license plate code, a license plate jurisdiction, a make/model of vehicle, a color of vehicle, a type of vehicle (e.g., car, van, motorcycle, etc.), a link to a prior record related to the same vehicle and/or a total length of time since the vehicle was first identified in the position, a physical tag identifier such as a disability tag, student tag, employee tag, etc. (e.g., identified through image capture of a hangtag, sticker, etc.), an electronic tag identifier (e.g., identified through wireless transmission such as Bluetooth transmission), and/or at least a portion of an image including the vehicle, a time remaining (e.g., in relation to an amount paid for parking in the position and/or a time limit associated with the parking space).

Although described in relation to a particular series of operations, in other implementations, the operations of the method 600 may vary. In some embodiments, the method 600 includes more or fewer operations. For example, prior to uploading the record(s) of the parked vehicle(s) (622), the record(s) may be encrypted, for example using asymmetric cryptography, to comply with data protection laws. In a similar example, individually identifying information may be scrubbed prior to upload (622), such as a portion of a photo of the vehicle may be obscured and/or a complete license plate identifier may be truncated to a partial license plate identifier. In another example, in some embodiments, one or more metrics are calculated prior to upload of the records (622). For example, statistics based on license plate information may be performed on local data, with the metrics themselves uploaded (622) along with the data records which lack full license plate information. Example metrics are described in relation to FIG. 6B.

In some embodiments, certain operations of the method 600 are performed in a different order, and/or certain operations of the method 600 are performed in parallel. For example, after associating the vehicle with the attribute(s) (616), it may be determined if the parking space is a restricted area (608) in comparing the pictured vehicle to the type of parking space. In illustration, a vehicle lacking a disability plate or tag may be parked in a disabled parking zone, or a non-electric vehicle may be parked in an EV parking zone. In this manner, a designated parking spot may also be associated as a restricted area parking space. Other modifications of the method 600 are possible while remaining within the scope and spirit of the method 600.

Figure 6B:
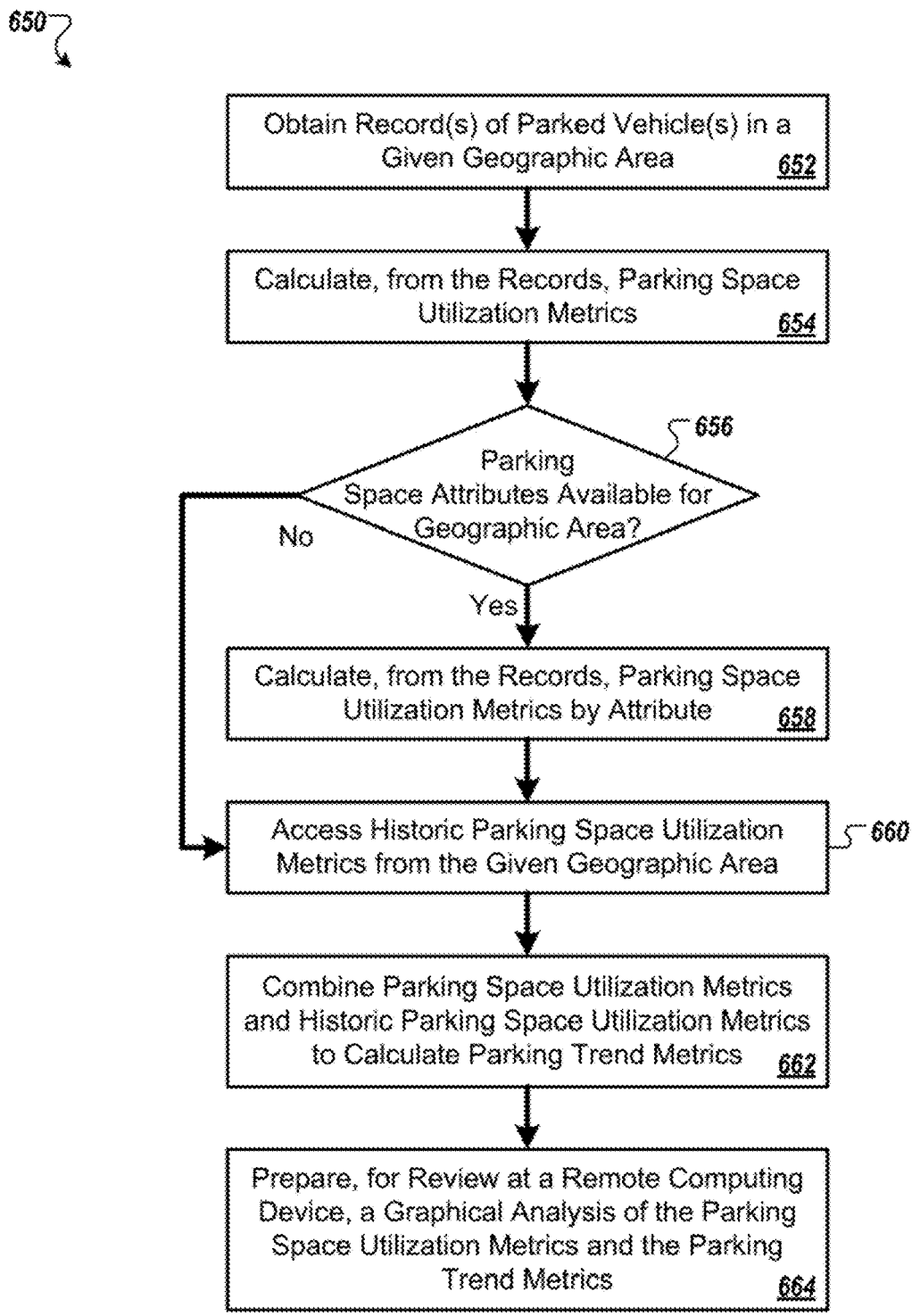
FIG. 6B illustrates a flow chart of an example method for calculating parking metrics and usage trends based on data captured by a mobile system for automatically detecting parked vehicles.

FIG. 6B illustrates a flow chart of an example method 650 for analyzing parking utilization data captured using a mobile system for recognizing objects of interest such as the system 100 of FIG. 1. The method 650, for example, may be performed at least in part by a remote computing system available to the in-vehicle system 104 and/or the portable computing device 106 via the network 108.

In some implementations, the method 650 begins with obtaining records of parked vehicles in a given geographic area (652). The given geographic area, for example, can include one or more streets in a geographic area, such as a metropolitan area. Turning to FIG. 7B, the records, for example, may be identified using a street identifier 722 (e.g., corresponding to one or more blocks, groupings of building numbers, etc.) and/or a street name 724. As illustrated, the geographic area encompasses 6 different street names 724 and a total of 23 different street identifiers 722. Street identifiers, in some embodiments, may include an indication of the side of each street (e.g., North, South, East, or West, etc.).

Returning to FIG. 6B, in some implementations, parking space utilization metrics are calculated (654). The parking space utilization metrics, in some examples, can include a number of legally parked vehicles, a number of illegally parked vehicles, a total number of parked vehicles, a total number of parking spaces utilized in the geographic region, and/or a number of vehicles remaining in a parking position by length of time (e.g., less than 20 minutes, less than 30 minutes, 30 minutes to 1 hour, up to 2 hours, etc.). If a total number of parking spaces in the geographic region is known, based on automated identification and tallying and/or from pre-defined map data, the space utilization metrics may include a percentage of parking spaces occupied. Turning to FIG. 7B, for example, metrics for each street identifier 722 are calculated based on total utilization of parking spaces throughout the parking available within an expanse designated by the street identifier 722.

In some embodiments, where information regarding the parked vehicles is identified, the information is used to calculate a portion of the metrics. The information, in one example, may include identifying that discounted or free parking access has been applied due to permit status (e.g., resident, employment, student, disability, etc.). In another example, if a parking permit tag (e.g., an electronic signature read by the mobile recognition system, a sticker recognized via image analysis, etc.) is identified, permit parking metrics may be calculated and compared to non-permit (e.g., visitor) metrics.

Figure 7A:
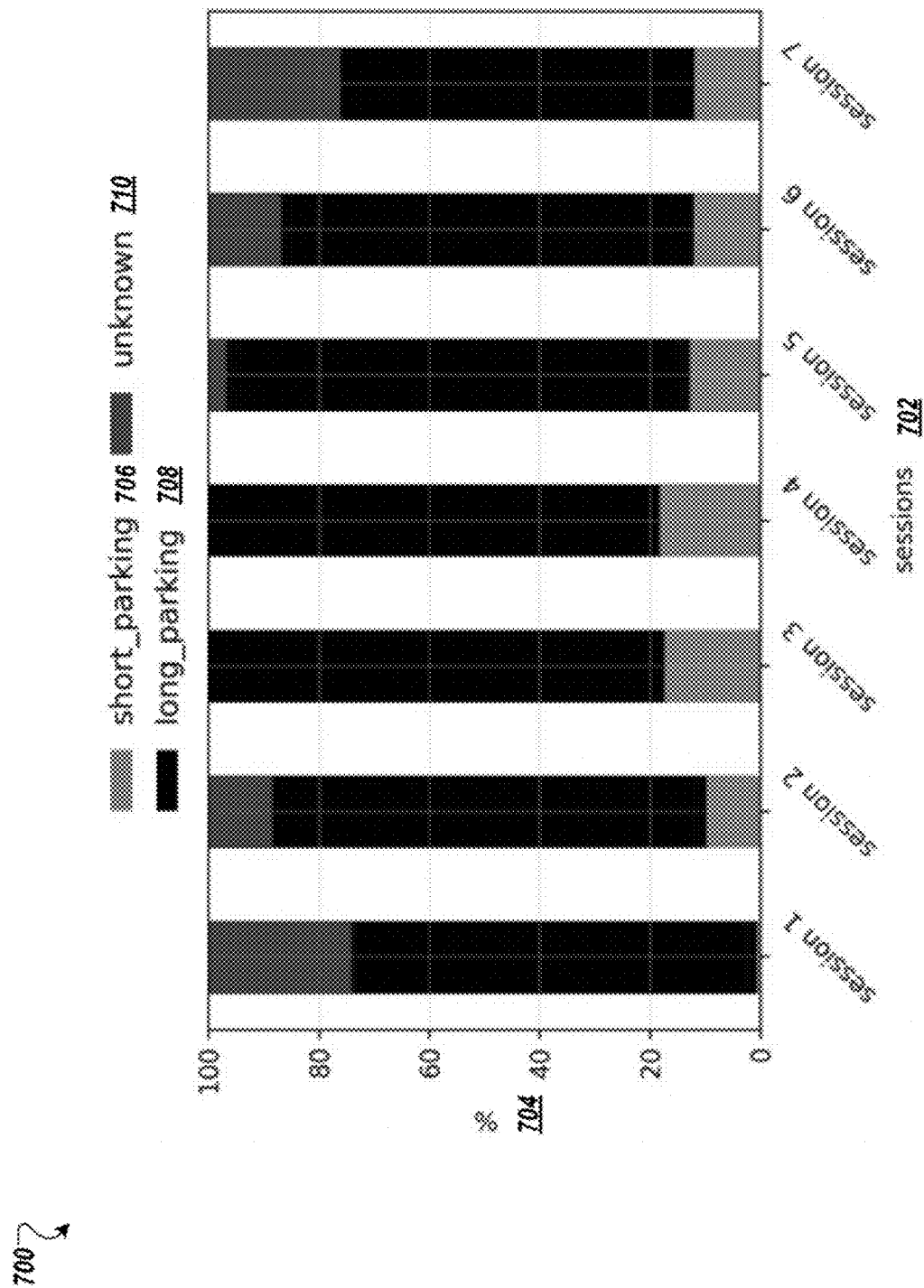

Returning to FIG. 6B, in some implementations, if parking space attributes are available for the geographic area (656), parking space utilization metrics by attribute are calculated (658). One or more attributes, for example, may be linked to a parking space by geographic coordinates. The metrics by attribute, in some examples, can include a number of vehicles positioned in long-term parking, a number of vehicles positioned in short-term (e.g., limited time) parking, and/or a number of parking spaces utilized by type (e.g., short-term, long-term, paid, free, reserved, permit-only, etc.). For example, as shown in FIG. 7A, the parked vehicles within the geographic area may be divided by short-term parking 706, long term parking 708, and unknown (e.g., attributes for the spot may be unavailable). Further, if a total number of parking spaces per type of parking space is known, the metrics may include, in some examples, percentage of permit-only parking utilized, percentage of disability parking utilized, etc.

In some implementations, historic parking space utilization metrics from the given geographic area are accessed (660). The historic space utilization metrics, for example, may represent a prior timeframe of the same day, the past day, the past week, and/or the past month. Discrete time-frames may be identified such as, in some examples, weekdays, weekends, peak commute hours, business (e.g., workday) hours, evening hours, and/or nighttime/overnight hours. As illustrated in FIG. 7A (and, similarly, in FIG. 7B), multiple sessions 702 of data may be captured, each session representing a time period where the geographic region was monitored by a mobile system for recognizing objects. A session, for example, may represent a single "loop" through the geographic region by the mobile system. Depending upon the length of the route and the current traffic, a timeframe of a session may therefore vary from region-to-region as well as from session-to-session.

In some implementations, parking space utilization metrics and historic parking space utilization metrics are combined to calculate parking trend metrics (662). The trends, in some examples, may include typical weekend parking numbers and/or rates, typical weekday parking numbers and/or rates, typical evening parking numbers and/or rates, and/or time period exhibiting historic highest and/or lowest parking rates. For example, turning to FIG. 7B, for each session 726 and for each street identifier 724, a rate of utilization is illustrated. The rates of utilization are separated into categories 728: very low (<50%); low (50%-69%); medium (70%-89%): high (90%-99%); very high (100%-109%); and not legally covered (>109%). Rates in the not legally covered range, for example, demonstrate that there is significant illegal parking (e.g., in prohibited areas) in the region of the street identifier 724. A rate above 100% (e.g., very high) that does not signify widespread illegal parking may be due, for example, to motorcycles and/or mopeds parked two to a space. In other implementations, any parking utilization above 100% may be deemed as representing illegal parking.

Figure 7C:
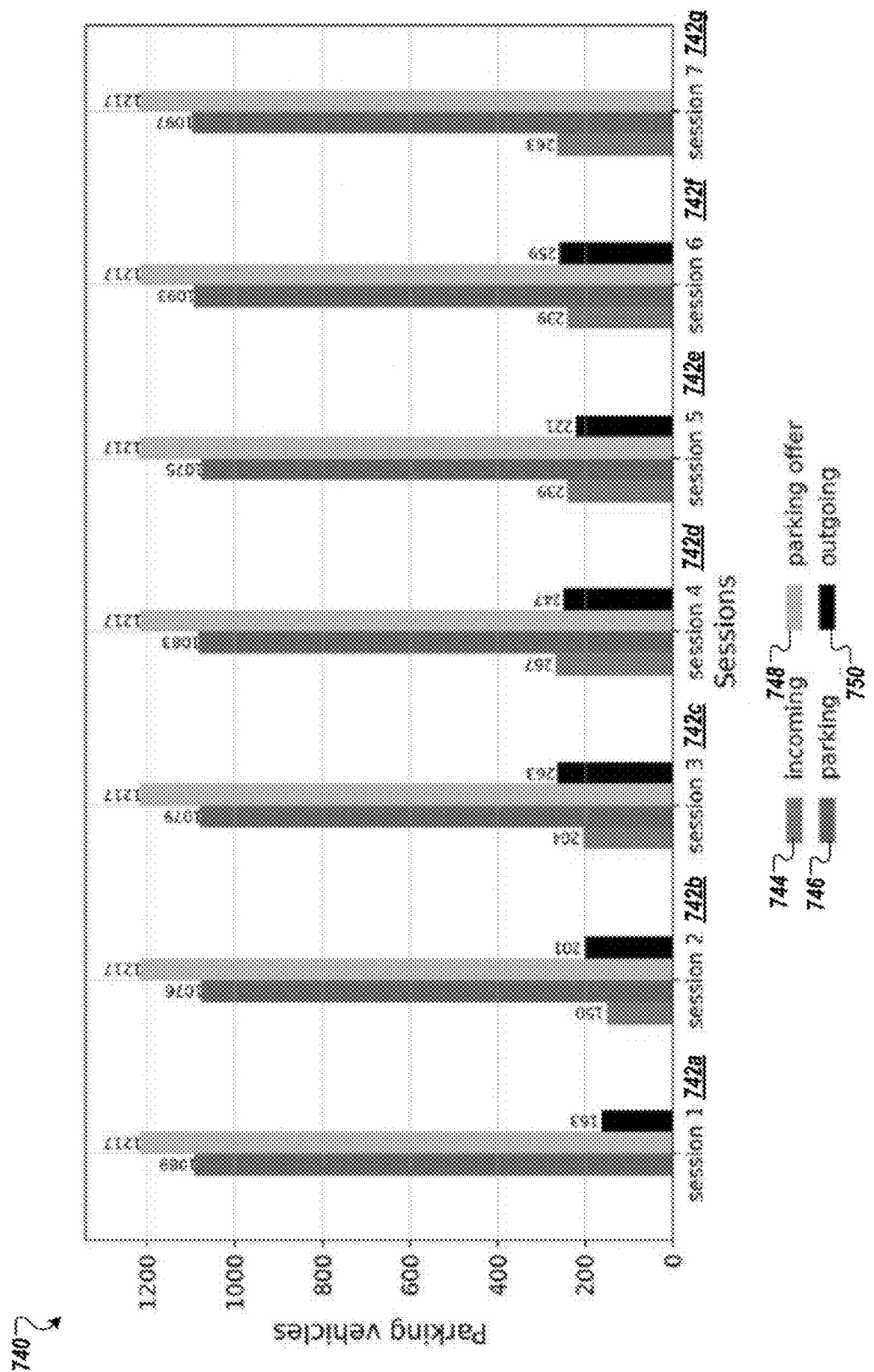

Further, in some embodiments, the trends may include data regarding vehicles seeking parking spaces and vehicles leaving parking spaces (e.g., parking turnover metrics). For example, turning to FIG. 7C, a graph 740 presents, for each session 742, counts of incoming vehicles 744, parked vehicles 746, total available parking spaces 748, and outgoing vehicles 750. The graph 740, for example, may represent parking available in a residential area or near one or more residential and/or multi-purpose buildings (e.g., apartment buildings, above-shopping condominiums, etc.). As can be seen, for example, a number of vehicles outgoing 750 exceeds a number of vehicles incoming 744 for the first three sessions 742a-c (e.g., residents leaving for work, school, etc.). Conversely, during a final session 742g, no outgoing vehicles 750 are logged, which may be representative of residents returning for the evening after businesses in the vicinity have closed. The counts related to incoming 744 and outgoing 750, for example, may be based on differences in occupancies of spaces as well as, in some embodiments, turnover of a same parking space (e.g., a first vehicle identified in a prior session is replaced by a second vehicle in the subsequent session). The graph 740, for example, may provide insights in parking demands throughout time.

The metrics, as described above, may be generated for an entire region, certain sections of the region (e.g., by street, by block, by an attraction (e.g., streets running through or abutting a museum, theater district, sport venue, etc.), and/or street identifier by street identifier. For example, the metrics may be used to identify areas in which the greatest quantity of parking is desired based on parking utilization metrics.

In some implementations, a graphical analysis of the parking space utilization metrics and the parking trend metrics is prepared for review at a remote computing device (664). The graphical analysis, in some examples, may be presented in a file format, a browser-enabled format, and/or an API data transfer format (e.g., JSON). The graphical analysis may include map overlaps, bar graphs, line graphs, tables, and/or charts of data. The graphical analysis, for example, may include any of the graph 700 of FIG. 7A, the graph 720 of FIG. 7B, or the graph 740 of FIG. 7C.

Although described in relation to a particular series of operations, in other implementations, the operations of the method 650 may vary. In some embodiments, the method 650 includes more or fewer operations. For example, in certain embodiments, the method 650 may include comparing parking space utilization metrics of the geographic area to parking space utilization metrics in another geographic area. For example, parking patterns and volumes between regions of a metropolitan area (e.g., a financial district, an entertainment district, a shopping district, etc.) may be compared and contrasted using the records collected by a vehicle-mounted sensor system. In some embodiments, certain operations of the method 650 are performed in a different order, and/or certain operations of the method 650 are performed in parallel. For example, parking space utilization metrics (654) and parking space utilization metrics by attribute (658) may be calculated in any order or at least partially concurrently. Other modifications of the method 650 are possible while remaining within the scope and spirit of the method 650.

Reference has been made to illustrations representing methods and systems according to implementations of this disclosure. Aspects thereof may be implemented by computer program instructions. These computer program instructions may be provided to a processor of a general-purpose computer, special purpose computer, or other programmable data processing apparatus and/or distributed processing systems having processing circuitry, such that the instructions, which execute via the processor of the computer or other programmable data processing apparatus, create means for implementing the functions/operations specified in the illustrations.

One or more processors can be utilized to implement various functions and/or algorithms described herein. Additionally, any functions and/or algorithms described herein can be performed upon one or more virtual processors. The virtual processors, for example, may be part of one or more physical computing systems such as a computer farm or a cloud drive.

Aspects of the present disclosure may be implemented by software logic, including machine readable instructions or commands for execution via processing circuitry. The software logic may also be referred to, in some examples, as machine readable code, software code, or programming instructions. The software logic, in certain embodiments, may be coded in runtime-executable commands and/or compiled as a machine-executable program or file. The software logic may be programmed in and/or compiled into a variety of coding languages or formats.

Aspects of the present disclosure may be implemented by hardware logic (where hardware logic naturally also includes any necessary signal wiring, memory elements and such), with such hardware logic able to operate without active software involvement beyond initial system configuration and any subsequent system reconfigurations (e.g., for different object schema dimensions). The hardware logic may be synthesized on a reprogrammable computing chip such as a field programmable gate array (FPGA) or other reconfigurable logic device. In addition, the hardware logic may be hard coded onto a custom microchip, such as an application-specific integrated circuit (ASIC). In other embodiments, software, stored as instructions to a non-transitory computer-readable medium such as a memory device, on-chip integrated memory unit, or other non-transitory computer-readable storage, may be used to perform at least portions of the herein described functionality.

Various aspects of the embodiments disclosed herein are performed on one or more computing devices, such as a laptop computer, tablet computer, mobile phone or other handheld computing device, or one or more servers. Such computing devices include processing circuitry embodied in one or more processors or logic chips, such as a central processing unit (CPU), graphics processing unit (GPU), field programmable gate array (FPGA), application-specific integrated circuit (ASIC), or programmable logic device (PLD). Further, the processing circuitry may be implemented as multiple processors cooperatively working in concert (e.g., in parallel) to perform the instructions of the inventive processes described above.

The process data and instructions used to perform various methods and algorithms derived herein may be stored in non-transitory (i.e., non-volatile) computer-readable medium or memory. The claimed advancements are not limited by the form of the computer-readable media on which the instructions of the inventive processes are stored. For example, the instructions may be stored on CDs, DVDs, in FLASH memory, RAM, ROM, PROM, EPROM, EEPROM, hard disk or any other information processing device with which the computing device communicates, such as a server or computer. The processing circuitry and stored instructions may enable the computing device to perform, in some examples, the method 200 of FIG. 2A and FIG. 2B and/or the method 500 of FIG. 5.

These computer program instructions can direct a computing device or other programmable data processing apparatus to function in a particular manner, such that the instructions stored in the computer-readable medium produce an article of manufacture including instruction means which implement the function/operation specified in the illustrated process flows.

Embodiments of the present description rely on network communications. As can be appreciated, the network can be a public network, such as the Internet, or a private network such as a local area network (LAN) or wide area network (WAN) network, or any combination thereof and can also include PSTN or ISDN sub-networks. The network can also be wired, such as an Ethernet network, and/or can be wireless such as a cellular network including EDGE, 3G, 4G, and 5G wireless cellular systems. The wireless network can also include Wi-Fi®, Bluetooth®, Zigbee®), or another wireless form of communication. The network, for example, may support communications between the in-vehicle system 104 and the mobile device 106, between the roof-mounted unit 102 and the in-vehicle system 104, between the in-vehicle system 104 and one or more computing systems of the network 108, and/or between the mobile device 106 and one or more computing systems of the network 108 of FIG. 1.

The computing device, in some embodiments, further includes a display controller for interfacing with a display, such as a built-in display or LCD monitor. A general purpose I/O interface of the computing device may interface with a keyboard, a hand-manipulated movement tracked I/O device (e.g., mouse, virtual reality glove, trackball, joystick, etc.), and/or touch screen panel or touch pad on or separate from the display. The display controller and display may enable presentation of information to the driver of the vehicle 120 by the in-vehicle system 104, to the user of the mobile device 106 on its display, and/or to the driver of the identified vehicle of the method 500 of FIG. 5 when entering vehicle characteristics in the mobile device app, browser-based application or parking kiosk.

Moreover, the present disclosure is not limited to the specific circuit elements described herein, nor is the present disclosure limited to the specific sizing and classification of these elements. For example, the skilled artisan will appreciate that the circuitry described herein may be adapted based on changes in battery sizing and chemistry or based on the requirements of the intended back-up load to be powered.

The functions and features described herein may also be executed by various distributed components of a system. For example, one or more processors may execute these system functions, where the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system, in some examples, may be received via direct user input and/or received remotely either in real-time or as a batch process.

Although provided for context, in other implementations, methods and logic flows described herein may be performed on modules or hardware not identical to those described. Accordingly, other implementations are within the scope that may be claimed.

In some implementations, a cloud computing environment, such as Google Cloud Platform™ or Amazon™ Web Services (AWS™), may be used perform at least portions of methods or algorithms detailed above. The processes associated with the methods described herein can be executed on a computation processor of a data center. The data center, for example, can also include an application processor that can be used as the interface with the systems described herein to receive data and output corresponding information. The cloud computing environment may also include one or more databases or other data storage, such as cloud storage and a query database. In some implementations, the cloud storage database, such as the Google™ Cloud Storage or Amazon™ Elastic File System (EFS™), may store processed and unprocessed data supplied by systems described herein. For example, the contents of the data store 110 of FIG. 1 may be maintained in a database structure.

The systems described herein may communicate with the cloud computing environment through a secure gateway. In some implementations, the secure gateway includes a database querying interface, such as the Google BigQuery™ platform or Amazon RDS™. The data querying interface, for example, may support access by the in-vehicle system 104 of FIG. 1.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A method for automatically identifying parking violations, the method comprising:
   providing a vehicle-mounted sensor system comprising one or more imaging sensors, one or more positioning sensors, and one or more distance sensors;
   obtaining, by processing circuitry, a plurality of images captured by the one or more imaging sensors while driving a repeating route past a plurality of parking spots;
   analyzing, by the processing circuitry, the plurality of images to detect a vehicle; and
   responsive to detecting the vehicle in one or more images of the plurality of images,
      extracting, by the processing circuitry from the one or more images, a license plate identifier of the vehicle,
      calculating, by the processing circuitry, a geographic position corresponding to the vehicle, by
         obtaining, by the processing circuitry, position sensor readings captured by the one or more positioning sensors,
         obtaining, by the processing circuitry, a plurality of distance sensor readings captured by at least a portion of the one or more distance sensors,
         combining, by the processing circuitry, the plurality of distance sensor readings with one or more elements in at least one image of the one or more images of the plurality of images,
         identifying, by the processing circuitry, a distance sensor point close to the vehicle from the combined plurality of distance sensor readings and the one or more elements, and
         calculating, by the processing circuitry, the geographic position corresponding to the vehicle using the position sensor readings and the distance sensor point,
      comparing, by the processing circuitry, the license plate identifier and the geographic position corresponding to the vehicle to one or more stored data records to identify a match, wherein
         each data record of the one or more stored data records represents a respective vehicle of a plurality of vehicles detected during a prior time period before a time of detecting the vehicle, and
      after identifying the match between the vehicle and a given data record of the one or more stored data records, logging, by the processing circuitry, a parking violation.

2. The method of claim 1, wherein logging the parking violation comprises issuing a ticket.

3. The method of claim 1, further comprising, after identifying the match and prior to logging the parking violation:
   calculating a length of time parked in the geographic position, wherein the geographic position is associated with a maximum parking time; and
   logging the parking violation upon confirming the vehicle has been parked in the geographic position longer than the maximum parking time.

4. The method of claim 3, further comprising determining, by the processing circuitry, that the vehicle is parked in a designated parking space, wherein the maximum parking time is associated with the designated parking space.

5. The method of claim 4, wherein determining the vehicle is parked in the designated parking space comprises determining the geographic position corresponds to the designated parking space.

6. The method of claim 1, wherein each record of the one or more stored data records comprises:
   an identifier corresponding to a non-uniquely identifying portion of a license plate identifier of a subject vehicle of the respective record; and
   RFID data captured in a region of the subject vehicle.

7. The method of claim 6, wherein extracting the license plate identifier of the vehicle comprises extracting the non-uniquely identifying portion of the license plate identifier, the method further comprising, after identifying the match:
   extracting a complete license plate identifier of the vehicle, wherein
      logging the parking violation comprises logging the parking violation against the complete license plate identifier.

8. The method of claim 1, wherein combining the plurality of distance sensor readings with the one or more elements in the one or more images comprises projecting a set of three-dimensional distance signal points into a two dimensional image matrix of a given image of the at least one image.

9. The method of claim 8, wherein combining the plurality of distance sensor readings with the one or more elements in the one or more images comprises:
   synchronizing timestamps of capture of the one or more images with timestamps of capture of the set of three-dimensional distance signal points; and
   grouping a portion of the one or more images with a portion of the set of three-dimensional distance signal points by a discrete time interval.

10. The method of claim 9, wherein the discrete time interval is up to 50 milliseconds.

11. The method of claim 1, wherein identifying the match comprises calculating that a difference between a position recording in a respective data record of the one or more stored data records and the geographic position of the vehicle is within a threshold distance.

12. The method of claim 11, wherein the threshold distance is less than 1 meter.

13. The method of claim 1, wherein the vehicle-mounted sensor system is configured to be mounted on a roof of a vehicle.

14. The method of claim 1, wherein an in-vehicle computing system comprises at least a portion of the processing circuitry.

15. A system for automatically identifying parking violations, the system comprising:
   a sensor system comprising one or more imaging sensors, one or more positioning sensors, one or more distance sensors, and a housing configured to be mounted to a first vehicle;
   and
   processing circuitry configured to perform operations comprising
      obtaining a plurality of images captured by the one or more imaging sensors of the sensor system, wherein the plurality of images are captured while the first vehicle drives a repeating route past a plurality of parking spots,
      analyzing the plurality of images to detect at least one additional vehicle, and
      responsive to detecting a second vehicle of the at least one additional vehicle in one or more images of the plurality of images,
         extracting, from the one or more images, a license plate identifier of the second vehicle, calculating a geographic position corresponding to the second vehicle, by
   obtaining position sensor readings captured by the one or more positioning sensors,
   obtaining a plurality of distance sensor readings captured by at least a portion of the one or more distance sensors,
   combining the plurality of distance sensor readings with one or more elements in at least one image of the one or more images of the plurality of images,
   identifying a distance sensor point close to the second vehicle from the combined plurality of distance sensor readings and the one or more elements, and
   calculating the geographic position corresponding to the second vehicle using the position sensor readings and the distance sensor point,
comparing the license plate identifier and the geographic position corresponding to the second vehicle to one or more stored data records to identify a match, wherein each data record of the one or more stored data records represents a respective vehicle of a plurality of vehicles detected along the repeating route during a prior time period before a time of detecting the second vehicle, and
after identifying the match between the second vehicle and a given data record of the one or more stored data records, logging a parking violation.

16. The system of claim 15, wherein a second portion of the processing circuitry is remotely located from a first portion of the processing circuitry, wherein information is communicated from the first portion of the processing circuitry to the second portion of the processing circuitry via a wireless network.

17. The system of claim 15, wherein:
a housing of the sensor system houses a first portion of the processing circuitry; and
a second portion of the processing circuitry is disposed inside the first vehicle.

18. The system of claim 15, wherein the geographic position is calculated using a set of sensor readings obtained by one or more LIDAR sensors of the sensor system.

* * * * *